United States Patent [19]

Leman et al.

[11] Patent Number: 4,737,075
[45] Date of Patent: Apr. 12, 1988

[54] FLAPPING STOP DEVICE FOR A GYROPLANE ROTOR

[75] Inventors: Jean-Luc Leman, Aix-En-Provence; Bruno Guimbal, Chateauneuf-Les-Martigues, both of France

[73] Assignee: Aerospatiale Societe Nationale Industriellee, Paris, France

[21] Appl. No.: 885,996

[22] Filed: Jul. 16, 1986

[30] Foreign Application Priority Data

Jul. 22, 1985 [FR] France .................................. 85 11160

[51] Int. Cl.$^4$ .............................................. B64C 27/38
[52] U.S. Cl. .................................. 416/140; 416/134 A
[58] Field of Search .......... 416/134 A, 138 A, 140 A, 416/141

[56] References Cited

U.S. PATENT DOCUMENTS

| 3,556,673 | 1/1971 | Killian | 416/134 A |
| 3,761,199 | 9/1973 | Ferris et al. | 416/134 A |
| 4,135,856 | 1/1979 | McGuire | 416/134 A |
| 4,249,862 | 2/1981 | Waddington et al. | 416/134 A |
| 4,297,078 | 10/1981 | Martin | 416/140 A X |
| 4,304,525 | 12/1981 | Mouille | 416/140 A X |
| 4,361,415 | 11/1982 | Aubry | 416/134 A |
| 4,375,940 | 3/1983 | Lovera et al. | 416/168 R |
| 4,504,193 | 3/1985 | Mouille | 416/141 X |
| 4,512,717 | 4/1985 | Pancotti et al. | 416/141 X |
| 4,549,851 | 10/1985 | Pariani | 416/134 A |

FOREIGN PATENT DOCUMENTS 2427251 12/1979 France .
2116506A 9/1983 United Kingdom .

Primary Examiner—Everette A. Powell, Jr.
Attorney, Agent, or Firm—Armstrong, Nikaido, Marmelstein & Kubovcik

[57] ABSTRACT

The flapping stop device of the invention is intended for a gyroplane rotor comprising a hub (3) to which each blade (22) is connected by retaining and pivoting members (16) having two frames, one (17) of which is fixed to the hub (3) and the other (19) of which, in an internal radial position with respect to the first one, is locked for movement with the root (23) of the blade (22). The internal frame (19) has, projecting radially inwardly, at least one nose piece (29) having a stop surface and defining a convex cylindrical sliding surface (28) on the internal radial face of the frame (19). The nose piece or pieces (29) and the convex surface (28) cooperate respectively with one or more bearing surfaces (34) and a complementary concave surface (33) of a central stop (30) integral with the hub (3) or with the rotor mast (2).

11 Claims, 1 Drawing Sheet

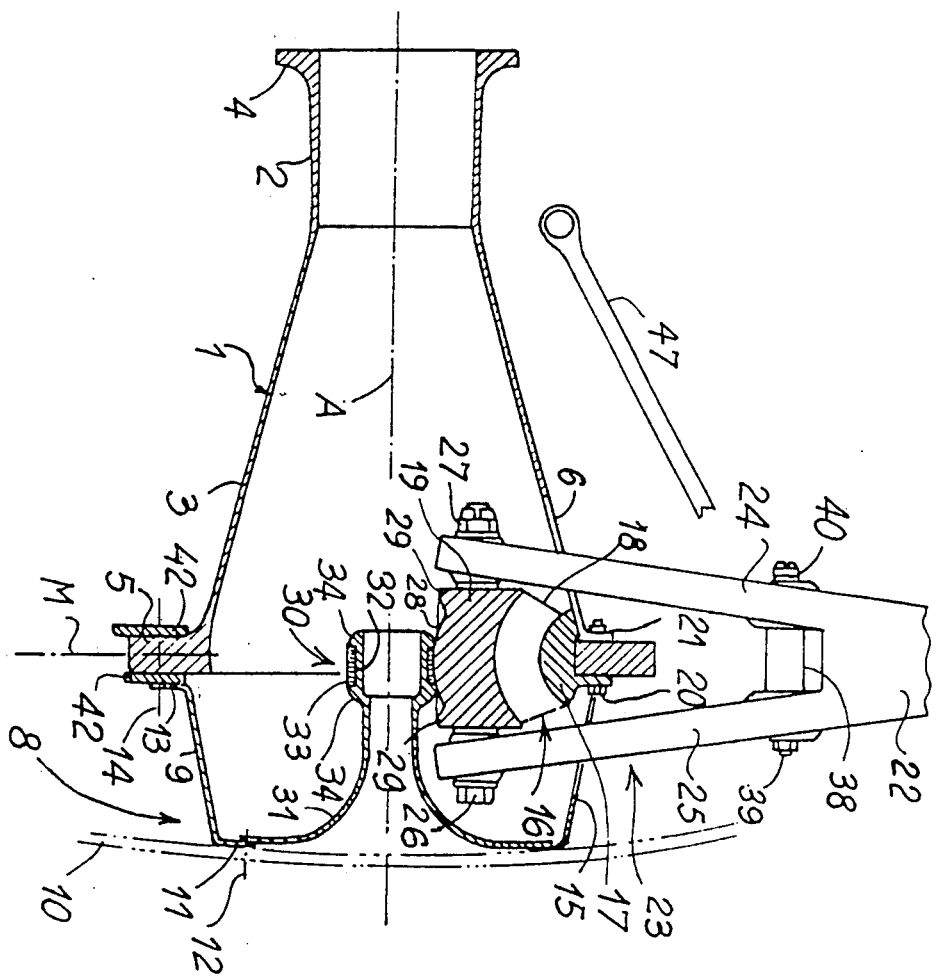

FLAPPING STOP DEVICE FOR A GYROPLANE ROTOR

The present invention relates to a flapping stop device for gyroplane rotors.

The invention relates more precisely to a flapping stop device intended to equip a helicopter rotor head of the type comprising a rotor hub which, on the one hand, is integral with a rotor mast intended to be rotated about its axis, merging with the axis of rotation of the rotor, and to which, on the other hand, each of the blades of the rotor is connected more particularly by means for retaining and pivoting this blade on the hub, these retaining and pivoting member comprising at least two frames one of which, in an external radial position with respect to the other, is rigidly fixed to the hub whereas the other frame, in the internal radial position, is interlocked for movement with the root of the blade.

So as to limit the downward bending of the blades of main rotors, under the effect of their own weight, at low rotational speeds and when the rotors are stopped, the rotor heads are generally equipped with flapping stops called "lower stops", and a large number of different lower stops devices has already been proposed. Most of the known constructions are of the type with stops which are retractable in flight under the effect of the centrifugal force. In this case, for each blade a stop is often provided pivoting on the lower part of the hub, about an axis which may be either parallel or perpendicular to the axis of rotation of the hub, and the stop has a weight at the end of an arm and is recalled by a spring into a position cooperating with a bearing heel rigidly fixed under the root of a blade or a member for connecting the blade to the hub, so that if the speed of rotation of the rotor is greater than a predetermined threshold, the effects of the centrifugal force exerted on the weight cause the stop to rotate against the return spring, so that the bearing heel cannot come into abutment against the stop, whereas if the speed of rotation of the rotor is less than the threshold, the spring returns the stop into the position allowing the heel to come into abutment, and limiting the flexion and the downward flapping of the corresponding blade. Other lower stop constructions comprise bearing heels each mounted for pivoting under the root of a blade or under the member connecting the blade to the hub and are returned by springs, and these bearing heels are retractable under the effect of the centrifugal force, whereas the stops with which these bearing heels cooperate are stops rigidly fixed to the lower part of the hub or to the part of the mast which is adjacent the hub. In this latter case, the assembly of the stops of the hub or of the mast may be formed by a single stop ring, fixed about a lower part of the hub or of the upper part of the mast, and against which all the retractable bearing shoes of the blades come to bear. There also exist lower stop constructions in which the bearing heels of the blades and the stops of the hub or of the mast are retractable in flight under the effect of the centrifugal force. Another type of lower stop device for a main helicopter rotor comprises bearing heels each rigidly fixed under the root of the blade or under the member connecting this blade to the hub, and a central and common flapping stop mounted movable about the mast or the lower part of the hub, and against which all the shoes come to bear when the speed of rotation of the hub is less than a threshold. This central and common stop is in the form of a rigid ring called "reciprocal ring", whose periphery forms a bearing track for the shoes, and which is mounted for radial or lateral sliding in a circular U shaped housing open radially outwardly and fixed about the mast or the lower part of the hub.

Such a device is described and shown more particularly in the French Pat. No. 2, 427 251, in which each bearing heel is fixed under the internal radial end of the lower branch of a forked part for fastening the corresponding blade to the hub, the forked fastening part being either a radial inward extension integrated with the root of the blade, or is formed by a radial clevis at the internal end of an added member for connecting to the root of the corresponding blade, this added member also having at its external end another clevis by which it is coupled to the root of the corresponding blade by two shafts substantially parallel to the axis of rotation of the rotor, and one of which is removable for allowing the blade to be folded back in the plane of the rotor by pivoting about the other shaft, this added member being shaped as a sleeve housing for example a device for automatically folding back the blades.

In both cases, the bearing heel is fixed under the internal end of the lower branch of this forked fastening part by the two bolts which fix the internal radial ends of the two branches of this fastening part to the internal radial frame of a spherical stratified stop which forms the means for retaining and pivoting the corresponding blade on the hub.

For helicopters carried on board ships or serving sea platforms, or more generally intended to operate in geographical zones where violent winds are met with, it has also been proposed to equip their main rotor heads with a flapping stop device limiting the upward movements of the blades under the effect of strong gusts of winds, when the rotor is stopped or during starting up or else during slowing down. These devices comprise flapping stops called "top stops", often formed, for each blade of the rotor, of a bearing heel mounted above the blade root or above a member connecting the blade to the hub, and which is fixed or retractable in flight under the effect of the centrifugal force, and cooperates with a stop mounted on the upper part of the hub and which is retractable in flight under the effect of the centrifugal force or is fixed.

Moreover, it has already been proposed to equip helicopter rear rotors also with flapping stop devices, limiting the movement of these rear rotors on one side or other of their plane of rotation. These devices comprise very often, for each blade, two bearing heels rigidly fixed to the root of the blade, respectively in an internal axial position and in an external axial position with respect to the blade root, all the internal heels bearing against a single annular shoe rigidly fixed in an internal axial position about the hub or the mast of the rear rotor for limiting the axially inward movements of the blades with respect to their plane of rotation, and all the external heels bearing against another annular shoe, rigidly fixed in an external axial position on the hub of the rear rotor for limiting the axially outward movements of the blades with respect to their plane of rotation.

In all these constructions of flapping stops, for main or rear rotors, it is necessary to add on the one hand to the hub and/or to the mast and, on the other, to the blade root or to a member connecting the blade root to the hub, a relatively large number of parts, which is a factor increasing the mass, the space required, the complexity and so the cost, during mounting as during maintenance, of the rotor head.

In addition, in these known constructions it is frequent for the essential parts of these flapping stop devices to be parts movable during operation on their support, which is a disadvantageous factor from the reliability and maintenance points of view. The present invention proposes overcoming these drawbacks, and provided a flapping stop device for gyroplane rotors of the type comprising a rotor hub, integral in rotation with a rotor mast, about an axis of rotation of the rotor, and to which each of the blades of the rotor is connected by members for retaining and pivoting this blade to the hub, which comprise at least two frames, one of which is rigidly fixed to the hub, whereas the other, in an internal radial position with respect to the other, is interlocked for movement with the root of the corresponding blade, the flapping stop device comprising, for each blade, at least one stop member interlocked for movement with the root of the blade and cooperating with at least one stop member integral with the hub and/or the mast so as to limit the movements of the blade on one side at least of the rotational plane of the blades, and it is characterized in that each stop member interlocked for movement with the root of the blade is supported by the internal radial frame of the corresponding retaining and pivoting members and projecting substantially radially inwardly with respect to this internal radial frame.

Advantageously, for each blade, at least one stop member supported by the corresponding internal radial frame is shaped as a nose piece forming a single piece with this frame and defining axially on one side a sliding surface in the shape of a convex spherical skull cap on the internal radial face of this frame, and the nose piece having, projecting outwardly from the convex sliding surface, a stop surface turned substantially towards the intersection of the axis of rotation of the rotor and of the plane of rotation of the blades, the corresponding stop member integral with the hub and/or the mast having a bearing surface substantially opposite the stop surface of the nose piece and defining on one side a concave sliding surface, of curvature complementary to that of the convex sliding surface, so that the two surfaces may slide one on the other, during the flapping of the corresponding blade, until the stop surface of the nose piece comes against the opposite bearing surface defining the concave sliding surface so as to limit the endmost flapping movement allowed for the blade on one side at least of the plane of rotation of the blade. Such a construction, because of the cooperation of the two complementary spherical sliding surfaces, allows a free range of movement of the blade in so far as the pitch and drag are concerned even at low speeds of rotation and when the rotor is stopped. It also allows, with the rotor stopped, the free range of movement of the angle of attack control to be checked.

So as to limit the flapping of the blade on both sides of their plane of rotation, the convex sliding surface is, for each blade, formed on the bottom of a recess machined in the internal radial face of the corresponding internal radial frame and axially defined between two nose pieces, and the concave sliding surface which cooperates with this convex sliding surface is defined between two bearing surfaces so that each of the two nose pieces comes into contact by its stop surface against one of the two bearing surfaces, after the two sliding surfaces have slid one on the other, during the extreme flapping movements allowed for the blade, on the corresponding side of the plane of rotation of the blades. Such a construction is then well adapted for a rear rotor, or for a main rotor whose blades must be limited in their deflection not only downwards, under the effect of their own weight, but also upwards, under the effect of gusts of wind and when the rotor is not rotating at a sufficient speed for the centrifugal force applied to the blades to stabilize the rotor disk.

In a simplified construction, the concave sliding surfaces of all the blades of the rotor are supported by the external lateral surface of a single central flapping stop, coaxial with the mast and with the hub. In this case, it is advantageous for the central flapping stop to be a member of axial revolution with concave external lateral surface defined between two truncated cone shaped surfaces each converging axially from the opposite side to the center of the central flapping stop and each forming the bearing surfaces cooperating with the stop surfaces of all the nose pieces situated axially on the same corresponding side of the center of the central flapping stop. This construction allows not only the cooperating of the convex sliding surfaces with a single concave and annular sliding surface to be simplified, but also allows the nose pieces situated axially on the same side of the rotational plane of the rotor to cooperate with a single annular and truncated cone shaped bearing surface.

In a preferred embodiment, the concave sliding surfaces are formed by the concave external lateral surface of a self lubricating bearing formed as a sleeve housed in a peripheral groove formed in the external lateral face of a tubular piece and between the two endmost axial truncated cone shaped surfaces of this tubular piece, which is carried by a support coaxial with the mast and with the hub.

For equipping rotor heads whose hub is tubular and open on the side opposite the mast, the flapping stop device is advantageously such that the central flapping stop and its support, as well as the internal radial frames supporting the nose pieces and the convex sliding surfaces are housed in the hub, so that this flapping stop device is a device internal to the hub, which reduces its vulnerability.

In this embodiment, if the tubular hub is at least partially closed by a cap, on the side opposite the mast, the support of the central flapping stop is advantageously widened out and carries the central flapping stop at its narrowed end, whereas it is fixed by its widened end to the cap fixed to the tubular hub.

But, whether a cap is fixed to the tubular hub or not, it is also possible for the support of the central flapping stop to comprise a tubular surface bearing against the internal face of the hub and/or of the mast, as well as a tubular centering sheel which is integral with the bearing surface and which supports the central flapping stop.

In one embodiment suitable for compact and simplified rotor head structures, the internal radial frame which, for each blade, has the convex sliding surface and the corresponding nose piece or nose pieces, is the internal radial frame of a stratified spherical stop which forms the member for retaining and pivoting the blade on the hub.

The invention will be better understood from the description of a particular example of a flapping stop device which is given below, by way of non limitative example, with reference to the single accompanying FIGURE showing a schematical view in axial section of a three blade rear helicopter rotor head equipped with an integrated hubmast associated with three non foldable blades, for it is in this application that a flapping stop device of the invention seems to present the greatest interest.

Referring to the single FIGURE, the rear rotor head comprises an integrated hub-mast 1, formed essentially of a one piece tubular body, with symmetry of revolution about an axis A, and whose internal part (with respect to the longitudinal plane of symmetry of the helicopter, not shown but perpendicular to axis A on the left of the single FIGURE) forms a tubular mast 2, whereas its external part forms a tubular hub body 3. Mast 2 has a general external cylindrical shape and its internal axial end is shaped as a foot 4 formed by an annular flange projecting radially outwardly of mast 2. By this foot 4, the mast 2 is fixed, by means of a ring of bolts (not shown) to a tubular member (also not shown) for fitting on an auxiliary gear box, mounted at the rear of the helicopter, and driving the hub-mast (1) and so the rotor in rotation about the axis A, which is also the axis of rotation of the rotor. Mast 2 is connected to the hub body forming part 3 and is extended directly by this part 3, which has a general substantially truncated cone shaped outer shape and widens out from the mast 2, as far as its free external axial end, which is locally and peripherally thickened as a circular reinforcing ring 5, with rectangular cross section and projecting radially outwardly of the hub body 3. The reinforcing ring 5 thus surrounds the circular opening at the free external end of the hub body 3. The one piece tubular body formed by mast 2 with its foot 4 and by the hub body 3 with its ring 5 is made from metal, for example from steel or titanium, and is formed from a die stamped or forged blank. Identical radial openings 6 in number equal to the number of blades of the rotor, so three openings 6 in this example, are formed in the portion of the hub body 3 which is directly adjacent the reinforcing ring 5 and are evenly spaced apart in the circumferential direction about the periphery of this portion. The external axial end of the hub body 3, having the ring 5, is covered by a cap 8 formed of a substantially truncated cone shaped side wall 9 and a circular cupola 10 slightly dished and having its concavity towards the hub body 3. The cupola 10, intended to reduce the aerodynamic drag of the rotor, especially at the level of the hub and the root of the blades, extends radially well beyond the side wall 9 which has, on its small base side, in an external axial position, a peripheral flange 11 bent back radially inwardly and against which the cupola 10 is fixed by a ring of screw-nut assemblies with axes 12. On its large base side, the side wall 9 of the cap is fixed coaxially to the hub body 3 while being fixed to ring 5. For this, the side wall 9 has three flanges 13 in the form of an arc of a circle, which are identical and bent back radially outwardly from the large base of wall 9 and are evenly spaced apart about the periphery of this large base, while each is separated from the other two flanges by an indentation 15 formed in wall 9 with a form substantially symmetrical with that of openings 6 with respect to the transverse median plane M or ring 5. Cap 8 is fixed to the hub body 3 by screwnut assemblies with axes 14 connecting the three flanges 13 to the ring 5, in a position such that each of the three indentations 15, radial and identical with each other, is axially opposite one of the three identical openings 6, while being separated therefrom by the thickness of ring 5. The external axial face of ring 5 thus defines with the three indentations of wall 9 three radial openings 15 each of which is substantially symmetrical with one of the three openings 6 with respect to ring 5. The hub-mast 1 with its cap 8 thus has three pairs of radial openings 6-15 spaced evenly apart over its periphery, the two openings 6, 15 of each pair being axially space apart on each side of ring 5.

Each of the three blades of the rotor is connected to the hub body forming part 3 by retaining and pivoting members. These latter may advantageously comprise at least one stratified stop housed in the hub body 3. In this example, these members are formed by a stratified spherical stop allowing the blade to pivot on hub 3 about its three flapping, drag and change of pitch axes, which intersect at the swivel point determined by the center of rotation of the corresponding stratified spherical stop. This member is a component henceforth well known, comprising essentially a central stratified part formed of a stack of layers in the shape of spherical skull caps and alternately rigid, for example made from metal, and resilient, made from a resilient material such as synthetic rubber, for example silicon elastomer, this central stratified part being vulcanized between two rigid frames, for example made from metal.

In the embodiment shown in the single FIGURE, each spherical stratified stop 16 is applied against the internal radial face of the reinforcing ring 5, between the two openings 6 and 15 of a pair of corresponding openings and stop 16 is fixed against ring 5 by its external radial frame 17 shaped, in its external part, as an outwardly open stirrup so as to partially straddle the ring 5. By its internal radial part, of a convex shape, the external frame 17 is fixed to the concave external face of the central stratified part 18 of this stop 16, whereas this central stratified part 18 is fixed, by its concave internal face, to the concave external radial part of the internal frame 19. The spherical stop 16 is disposed under cap 8 and inside the opening at the external axial end of the hub body 3, so that its center of rotation is situated in the median plane M of ring 5 and in the thickness of this latter, in the vicinity of its external radial face, and stop 16 is retained in position by means of a bolt 20 introduced parallel to axis A and from the outside of the hub body 3 into aligned holes pierced in the ring 5 and in the two branches of the stirrup of the external frame 17, a locked or pinned nut 21 being screwed and retained on the threaded end of the shank of bolt 20 which projects from the side of opening 6.

The root of each blade 22 is shaped as a forked fastening part 23 with two axially spaced apart branches, the internal branch 24 of which passes through the corresponding internal opening 6 and the external branch 25 of which passes through the corresponding external opening 15, the internal radial ends of the two branches 24 and 25 being fixed against the internal frame 19 of the spherical stop 16 by a bolt 26 which passes axially from the outside through aligned holes pierced in the internal frame 19 and in these internal ends of branches 24 and 25, the head of the bolt 26 bearing against the external branch 25, and a nut 27 being screwed and retained by a pin on the threaded end of the shank of bolt 26 which projects inwardly of the internal branch 24.

The internal frame 19, connecting the forked root 23 of blade 22 to the spherical stop 16 also serves as a spacer holding the two branches 24 and 25 apart with constant spacing.

For limiting the flapping movements of blade 22 on each side of the rotational plane of the rotor, merging substantially with the transverse plane M, a recess whose bottom forces a sliding surface 28 in the shape of a convex spherical skull cap is formed in the internal radial face of the internal radial frame 19 of the stratified spherical stop 16. This convex sliding surface 28 is defined on this internal face of frame 19, between two nose pieces 29, each of which projects substantially radially inwardly with respect to the sliding surface 28, and which each have a slanted stop face turned towards the intersection of axis A and the transverse plane M, this bearing face also projecting substantially radially inwardly with respect to the sliding surface 28. This sliding surface 28 and the two nose pieces 29 cooperate with a central flapping stop 30 which is mounted coaxially inside the hub-mast 1 by means of a widened out tubular support 31. By its most widened out external axial end this support 31 is fixed against the internal axial face of the peripheral flange 11 of the side wall 9 of cap 8, by means of screw-nut assemblies with axes 12 which also secure the cupola 10 to the side wall 9, whereas the narrowest internal axial end of support 31 is integral with the flapping stop 30. This latter is a member with axial symmetry of revolution, comprising a tubular piece with circular cross section which is surrounded by a self lubricating bearing 32, in the form of a sleeve whose lateral or external radial face forms a concave sliding surface 33, with curvature complementary to that of the convex sliding surface 28. Bearing 32 is housed in a circular recess formed in the external radial face of the tubular piece, between two annular and truncated cone shaped bearing surfaces 34 which converge from the side opposite to the center of stop 30 merging with the intersection of plane M and axis A, and which are thus slanted and turned radially outwardly and each towards one of the two nose pieces 29. The flapping stop device thus formed which is entirely internal to the hub-mast 1 is such that for the extreme angular flapping movement allowed for blade 22 on one side or the other of the rotational plane of rotor M, one of the nose pieces 29 comes into abutment against the facing bearing surface 34 on the central flapping stop 30, after the convex surface 28 has slid over the concave surface 33 of the bearing 32 of this central stop 30.

Moreover, each blade 22 is damped for drag and is recalled resiliently to its neutral axis for drag also by a resilient return and damping member (not shown) external to the hub-mast 1 and disposed laterally between the reinforcing ring 5 and the blade root 23. This drag member is coupled at its ends by ball joints, on the one hand to the blade root 23 and on the other to ring 5. The ball and socket joint coupling to the blade root 23 is mounted in a clevis carried laterally by a spacer 38 engaged between the external radial ends of branches 24 and 25 of the forked fastening root and to which the spacer 38 is fixed by two bolts 39 and pinned or locked nut 40 assemblies, the bolts 39 of which pass through facing holes pierced in branches 24 and 25 and in the spacer 38. This lateral clevis projects, with respect to the blade root 23, on the trailing edge side of the corresponding blade 22. The ball and socket joint for coupling the return member to hub 3 is mounted between two parallel fastening fittings 42 fixed against the faces of ring 5 by the screw-nut assemblies with axes 14 which simultaneously fix the flanges 13 of wall 9 of cap 8 to ring 5.

The spacer 38 is extended, on the leading edge side of blade 22, by a lever for controlling the angle of attack of the blade which ends in a clevis in which pivots, through a ball and socket joint, one end of a link 47 for controlling the pitch of the blade 22. Through cooperation of the two complementary sliding surfaces 28 and 33 of the flapping stop device, by acting on links 47 and without having to exert a considerable force, the angle of attack control can be operated, when the rotor is stopped and at slow rotational speeds of the rotor, for controlling the state thereof.

It can be seen moreover that the flapping stop device is well protected in the hub and very close to the axis A of the rotor, with which the central stop 30 is centered, without hindering the movements of the blades with respect to the hub-mast about the rotational centers of the stratified spherical stop 16. Furthemore, this flapping stop device only comprises a small number of parts which are to be added to the parts required on the rotor head, and the space required by this device is very limited. It will finally be noted that if the opening of the free end of the hub is not partially closed by a cap, the central flapping stop 30 may be mounted on the external axial narrowed end of a substantially truncated cone shape centering shell, disposed coaxially in the hub-mast, and whose internal widened axial end is integral with a substantially truncated cone shaped bearing surface for fixing against the internal face of the hub-mast, so that the support thus formed for the central stop 30 occupies an internal axial position with respect to the stop 30 and is directly fixed in the hub-mast 1, contrary to the solution shown in the single FIGURE.

We claim:

1. A flapping stop device for a gyroplane rotor, the rotor including a rotor hub rotatable about an axis (A) of rotation; a plurality of blades; a plurality of stratified spherical stops, each spherical stop connecting one of the blades to the hub, each spherical stop including at least two frames secured by resilient means permitting relative movement between the two frames; means securing one of said frames to the hub; and means securing the other frame radially inward of said one frame to a radially inward end of the corresponding blade;

said flapping stop device comprising:

a first stop member fixed to the hub, and second stop members, one for each blade, each carried by said other frame of the corresponding spherical stop and projecting radially inward to slidingly abut said first stop member and limit flapping movement of its respective connected blade on one side of a plane (M) of the rotation of the blades.

2. The flapping stop device defined by claim 1 wherein the internal radial face of said other frame of each spherical stop is formed as a convex surface; each of said second stop members is comprised of surface bounding said convex surface and facing the intersection of said axis of rotation (A) and said rotational plane (M); said first stop member is comprised of a bearing surface substantially facing said second stop member surface and bounding a curved surface complimentary to the curvature of said convex surface; said convex surface bears against and slides relative to said curved surface during permitted flapping movement of said blade.

3. The flapping stop device defined by claim 2 wherein said convex surface on the internal radial face of said other frame of each spherical stop bounded by axially spaced nosepieces formed integrally with said other frame; said curved surface is defined between two axially spaced bearing surfaces; each of the axially spaced nosepieces contact one of the two axially spaced bearing surfaces to limit flapping movement permitted for the respective connected blade on opposite sides of the rotational plane (M) of the blades.

4. The flapping stop device defined by claim 3 wherein said first stop member is defined by an external lateral surface of a central stop element positioned coaxial with the axis of rotation (A) of the rotor and the curved surface on the internal radial face of said other frame of all of the spherical stops supporting all of the blades of the rotor bear against said external lateral face.

5. The flapping stop device defined by claim 4 wherein said central stop element is fixed to the rotor hub.

6. The flapping stop device defined by claim 4, the rotor further including a rotor mast to which the rotor hub is locked, wherein said central stop element is fixed to the rotor mast.

7. The flapping stop device defined by claim 4 wherein said one central stop element is a member of axial revolution with said external lateral surface being defined between two truncated cone shaped surfaces converging toward the rotational plane (M) of the blades, each forming one of said two axially spaced bearing surfaces cooperating with stop surfaces of all the nose pieces situated axially on the same corresponding side of said rotational plane (M).

8. The flapping stop device defined in claim 7 wherein said central stop element is comprised of a tubular piece, a peripheral groove in the external lateral surface of said tubular piece is bounded by said two truncated cone shaped surfaces, said concave external lateral surface has a self-lubricating sleeve type bearing seated in said peripheral groove and said tubular piece is carried by a support coaxial with the rotor hub.

9. The flapping stop device defined by claim 4, the rotor hub being a tubular hub, wherein said central stop element and said other frame of all spherical stops including the convex bearing surface and nosepiece are housed in the tubular hub.

10. The flapping stop device defined by claim 9, the tubular hub having a cap fixed to one end thereof, wherein said central stop element is carried by a support coaxial with the tubular hub, said support flares outwardly from a diameter mounting said central stop element to a larger diameter partially closing the one end of said tubular hub and said larger diameter portion of said support is fixed to the cap.

11. The flapping stop device defined in claim 9, wherein said central stop element is carried by a tubular centering shell mounted to the interior surface of the hub.

* * * * *

UNITED STATES PATENT AND TRADEMARK OFFICE
CERTIFICATE OF CORRECTION

PATENT NO. : 4,737,075

DATED : April 12, 1988

INVENTOR(S) : Jean-Luc LEMAN et al

It is certified that error appears in the above-identified patent and that said Letters Patent is hereby corrected as shown below:

On the cover page, Item [73], "Aerospatiale Societe Nationale Industriellee" should read --Aerospatiale Societe Nationale Industrielle--.

Signed and Sealed this

Eighth Day of November, 1988

Attest:

DONALD J. QUIGG

Attesting Officer

Commissioner of Patents and Trademarks